(12) United States Patent
Higgs

(10) Patent No.: US 9,083,850 B1
(45) Date of Patent: Jul. 14, 2015

(54) VIDEO BLURRING IN A SECURE ENVIRONMENT

(71) Applicant: Securus Technologies, Inc., Dallas, TX (US)

(72) Inventor: Joseph Higgs, Fort Worth, TX (US)

(73) Assignee: Securus Technologies, Inc., Dallas, TX (US)

( * ) Notice: Subject to any disclaimer, the term of this patent is extended or adjusted under 35 U.S.C. 154(b) by 91 days.

(21) Appl. No.: 13/931,857

(22) Filed: Jun. 29, 2013

(51) Int. Cl.
  *H04N 7/14* (2006.01)
  *H04N 7/15* (2006.01)

(52) U.S. Cl.
  CPC .................................. *H04N 7/157* (2013.01)

(58) Field of Classification Search
  CPC ................................................ H04N 7/157
  USPC ......... 345/419; 348/51, 217.1, 241, 586, 625, 348/14.07; 370/240; 382/103, 254, 255, 382/118, 181; 396/133; 600/175, 587; 713/176; 726/33
  See application file for complete search history.

(56) References Cited

U.S. PATENT DOCUMENTS

| | | | |
|---|---|---|---|
| 6,646,687 B1* | 11/2003 | Vlahos | 348/586 |
| 6,801,642 B2* | 10/2004 | Gorday et al. | 382/118 |
| 7,027,659 B1* | 4/2006 | Thomas | 382/254 |
| 7,092,568 B2* | 8/2006 | Eaton | 382/181 |
| 7,316,032 B2* | 1/2008 | Tayebi et al. | 705/51 |
| 7,428,639 B2* | 9/2008 | Demos | 713/176 |
| 7,556,599 B2* | 7/2009 | Rovegno | 600/175 |
| 7,562,397 B1* | 7/2009 | Mithal et al. | 726/33 |
| 7,657,171 B2* | 2/2010 | Sundstrom | 396/133 |
| 7,783,075 B2* | 8/2010 | Zhang et al. | 382/103 |
| 8,106,954 B2* | 1/2012 | Sato et al. | 348/217.1 |
| 8,270,303 B2* | 9/2012 | Sauerwein et al. | 370/240 |
| 8,319,898 B2* | 11/2012 | Ueno et al. | 348/625 |
| 8,488,896 B2* | 7/2013 | Shi et al. | 382/255 |
| 2010/0085351 A1* | 4/2010 | Deb et al. | 345/419 |
| 2012/0249843 A1* | 10/2012 | Hayashi | 348/241 |
| 2013/0033586 A1* | 2/2013 | Hulyalkar | 348/51 |
| 2013/0226037 A1* | 8/2013 | Pinto et al. | 600/587 |

\* cited by examiner

*Primary Examiner* — Gerald Gauthier
(74) *Attorney, Agent, or Firm* — Fogarty, L.L.C.

(57) ABSTRACT

Methods and systems for video blurring in a secure environment are described. In one embodiment, the method includes receiving video at a video visitation device in a secure environment, adjusting a depth of field parameter for the video, such that an image of a first object at a first distance from the video visitation device is in focus and an image of a second object at a second distance from the video visitation device is blurred, and providing the video to a viewing device located outside of the secure environment.

21 Claims, 5 Drawing Sheets

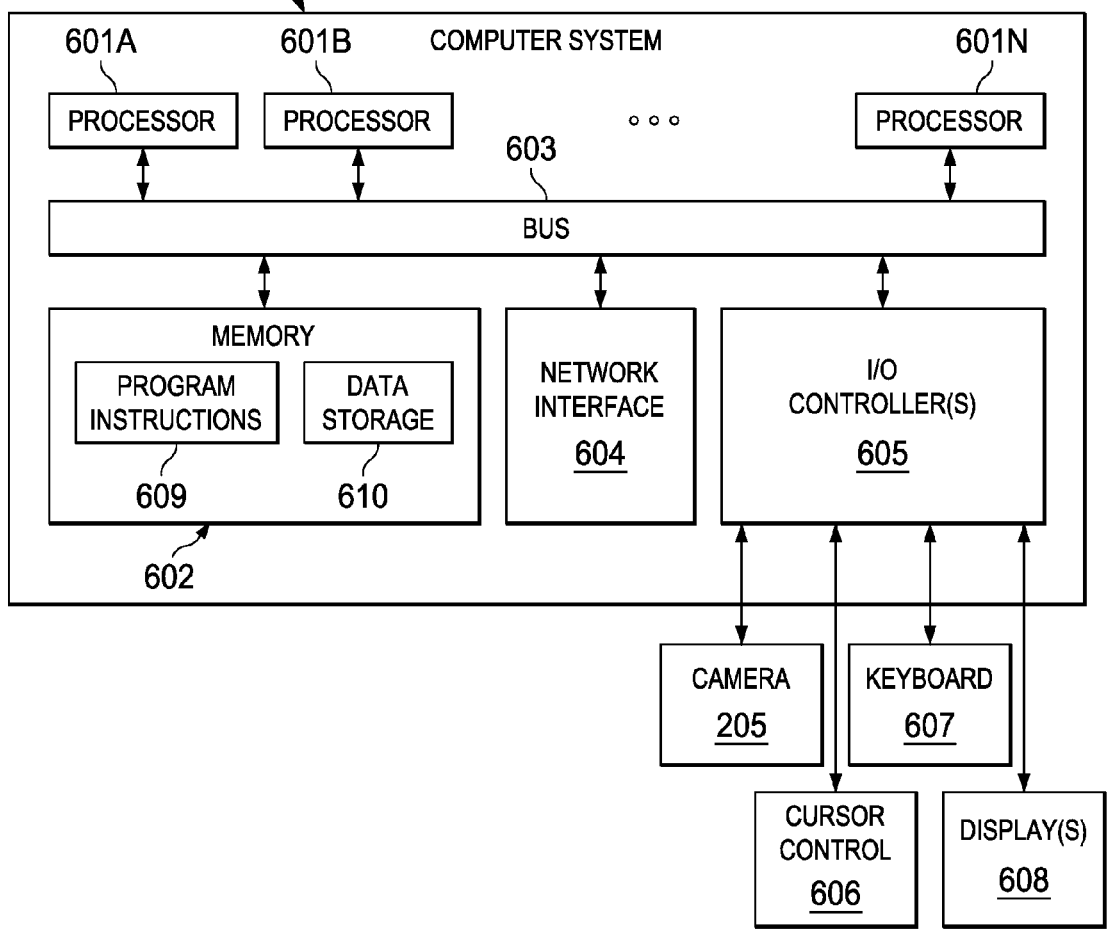
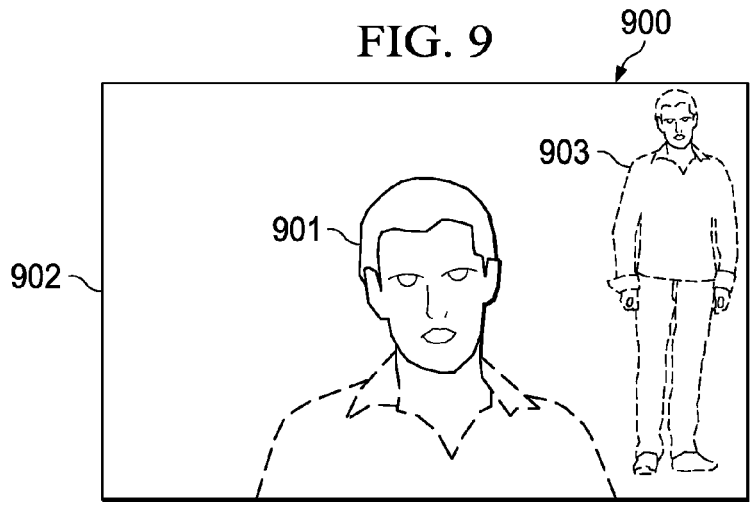

VIDEO BLURRING IN A SECURE ENVIRONMENT

BACKGROUND

The introduction of video services into inmate housing and common area locations for the purposes of video visitation and/or video calling has introduced an unanticipated issue related to what details are conveyed through the video to whoever is viewing it at the other end. Inmate housing environments simply were not designed with the expectation that those outside the facility would have a camera inside the housing units. As such, back ground details could include showers, bathrooms, interiors of cells, or just the general population going about their day. Additionally, other inmates who know they are on camera often act up and cause disruptions which can escalate and become safety issues.

In prior systems, the camera component of the video visitation/call system reveals more than is intended and much more than is desired. A means of not showing what is happening behind inmates participating in video visitations/calls is needed in order to safe guard the privacy and promote the safe use of video services provided within inmate housing areas.

Given the infancy of the use of video services within the correctional institution setting, previous methods of resolving the issue resorted to placing the video terminals outside of the general inmate population. This is undesirable as it negates one of the prime advantages of video visitations; namely, to provide visitations without having the security and administrative issues associated with moving inmates from housing locations to visitation locations.

One alternative solution is to design the housing units in such a way that the video terminals face an innocent area. This is impractical since most correctional institutions were constructed decades before and reconstruction would be too costly. Also, such floor plan designs will tend to rely on designing "nooks" to house the video services but such "nooks" are difficult for correctional officers to monitor and thus provide locations for violent and/or illicit activities to take place.

One previous technology uses facial recognition to "lock in" on the facial features of the inmate and blur everything but those features. This approach suffers as the inmate moves around and has the disadvantage of blurring much of the face and or torso of the inmate thus leading to an unsatisfactory visitation experience.

SUMMARY

Methods and systems for video blurring in a secure environment are described. In one embodiment, the method includes receiving video at a video visitation device in a secure environment, adjusting a depth of field parameter for the video, such that an image of a first object at a first distance from the video visitation device is in focus and an image of a second object at a second distance from the video visitation device is blurred, and providing the video to a viewing device located outside of the secure environment.

In on embodiment, adjusting the depth of field parameter may include adjusting an f-stop setting of a camera associated with the video visitation device. Adjusting the f-stop setting may further include adjusting a focal length of a lens coupled to the video visitation device. In an embodiment, adjusting the f-stop setting includes adjusting an aperture setting of the camera associated with the video visitation device.

In another embodiment, adjusting the depth of field parameter includes digitally processing the video received from the video visitation device in a video processing device to blur one or more objects at the second distance from the video visitation device.

In one embodiment, adjusting the depth of field parameter is remotely controllable by a third party. Additionally, the method may include providing the video to a second viewing device for security monitoring, the second viewing device being associated with a remote control device configured to allow the third party monitor to remotely control the depth of field parameter.

Various embodiments of tangible computer readable media are described. In one embodiment, the computer readable media comprises computer-readable code for receiving video from a video visitation device in a secure environment, storing the video received from the video visitation device in a data storage device, adjusting a depth of field parameter for the video, such that an image of a first object at a first distance from the video visitation device is in focus and an image of a second object at a second distance from the video visitation device is blurred, and providing the adjusted video to a viewing device located outside of the secure environment.

In one embodiment, adjusting the depth of field parameter further comprises processing the video received from the video visitation device in a video processing device to blur one or more objects at the second distance from the video visitation device. Adjusting the depth of field parameter may be remotely controllable by a third-party monitor.

The operations performed may further include providing the video to a second viewing device for security monitoring, the second viewing device being associated with a remote control device configured to allow the third-party monitor to remotely control the depth of field parameter. In an embodiment, the operations include providing the video stored in the data storage device to an investigator in response to indicia from the third-party monitor. In still further embodiments, the operations include providing the video stored in the data storage device to an investigator in response to a request from the investigator.

Embodiments of systems are also described. One embodiment of a system includes a data communication device configured to receive video from a video visitation device in a secure environment. The system may also include a data storage device coupled to the data communication device and configured to store the video received from the video visitation device. Additionally, the system may include a data processor configured to adjust a depth of field parameter for the video, such that an image of a first object at a first distance from the video visitation device is in focus and an image of a second object at a second distance from the video visitation device is blurred, wherein the data communication device is configured to provide the video to a viewing device located outside of the secure environment.

In an embodiment, the system includes a camera controller configured to adjust an f-stop setting of a camera associated with the video visitation device. The camera controller may be controllable by a third-party to remotely adjust the f-stop setting. Additionally, the camera controller may be configured to adjust a focal length of a lens coupled to the video visitation device. In an embodiment, the camera controller is further configured to adjust an aperture setting of the camera associated with the video visitation device.

In one embodiment, the system includes a second viewing device for security monitoring, the second viewing device being associated with a remote control device configured to allow a third-party to remotely control the depth of field parameter.

The data communication device may provide the video stored in the data storage device to an investigator in response to indicia from the third-party. In another embodiment, the system is configured to provide the video stored in the data storage device to an investigator in response to a request from the investigator.

BRIEF DESCRIPTION OF THE DRAWINGS

Figure 1:
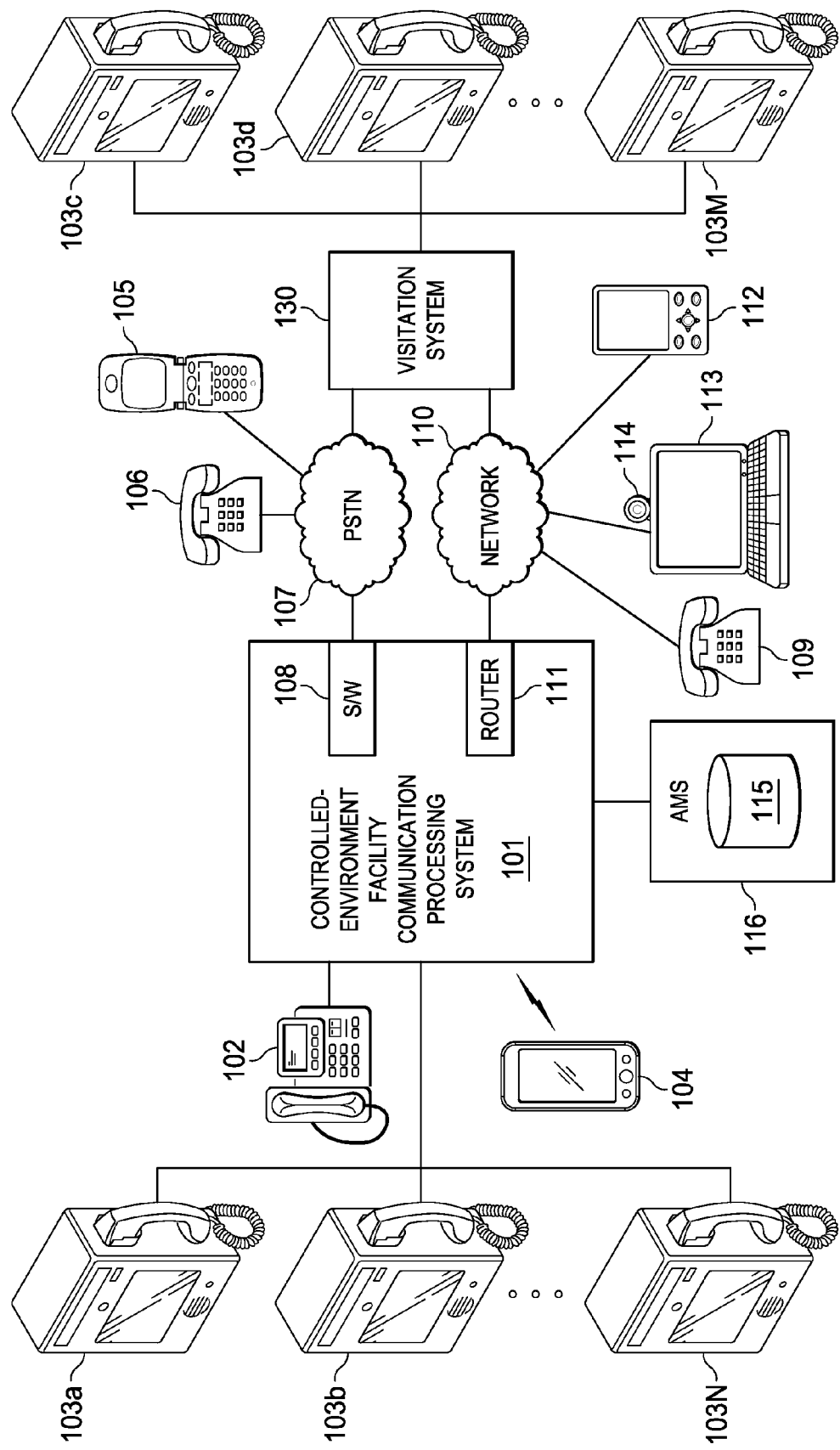

Having thus described the invention in general terms, reference will now be made to the accompanying drawings, which are not necessarily drawn to scale, and wherein:

FIG. 1 is a block diagram of an environment where a visitation system may be employed according to some embodiments.

Figure 2:
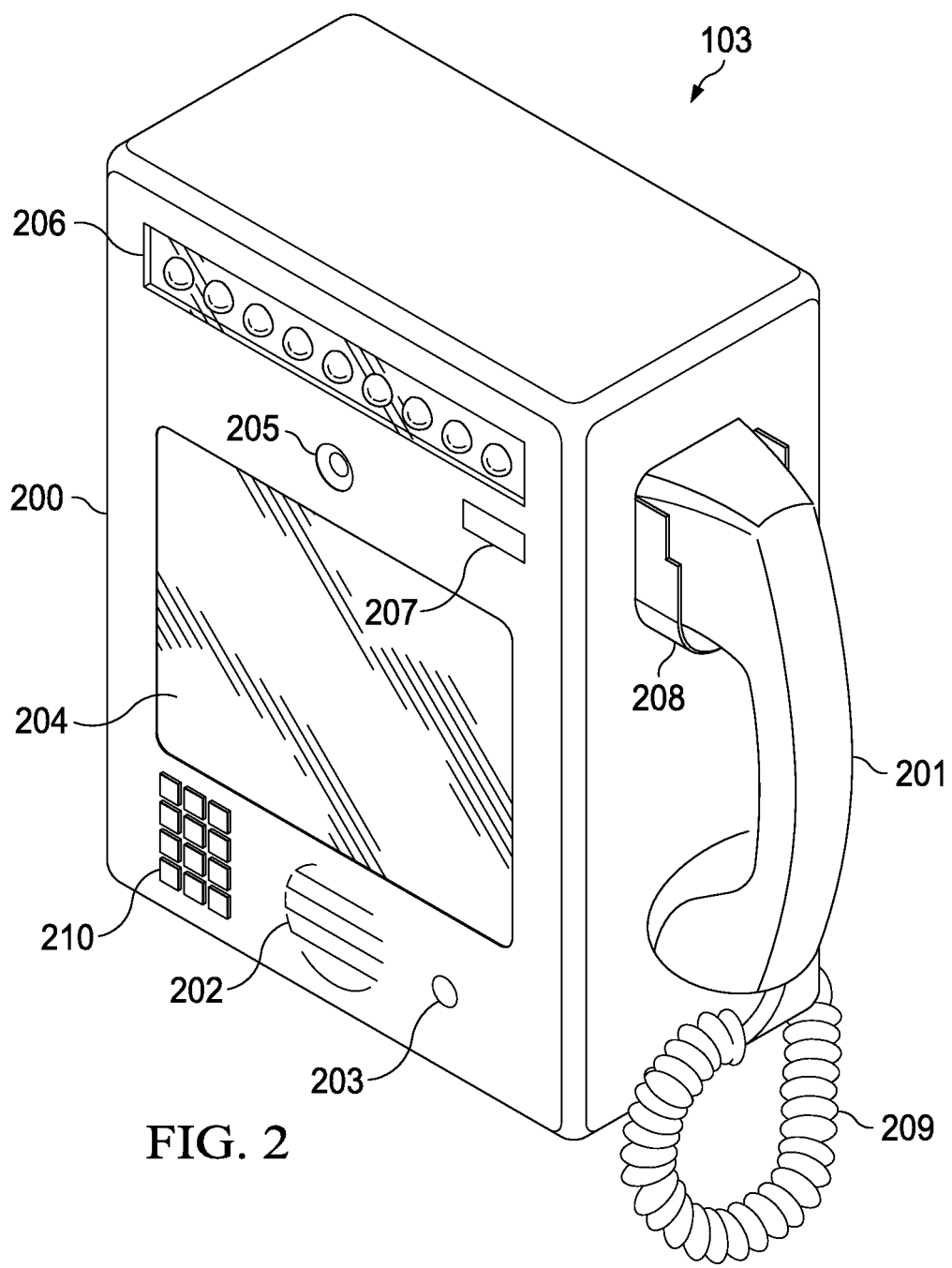

FIG. 2 is a diagram of a video visitation device according to some embodiments.

Figure 3:
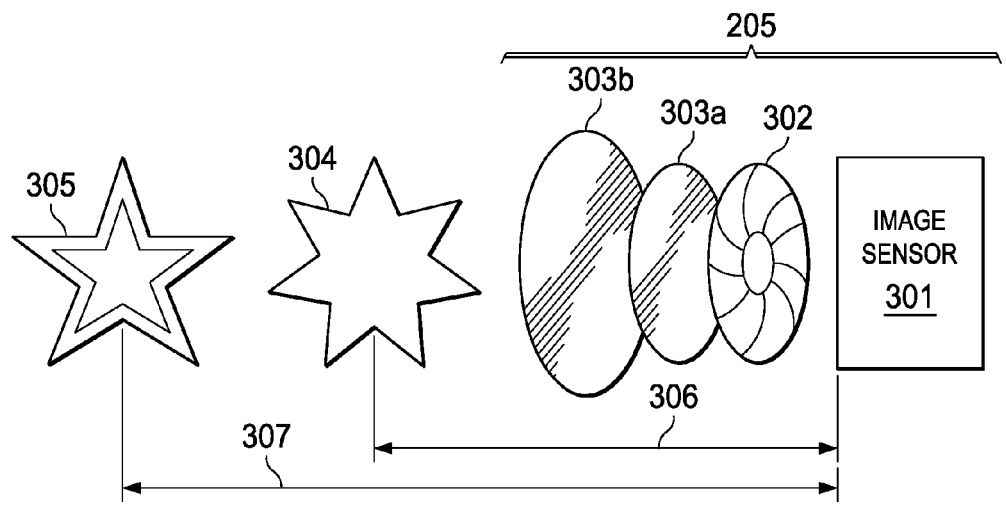

FIG. 3 is a block diagram illustrating one embodiment of a video camera device for use in a video visitation system.

Figure 4:
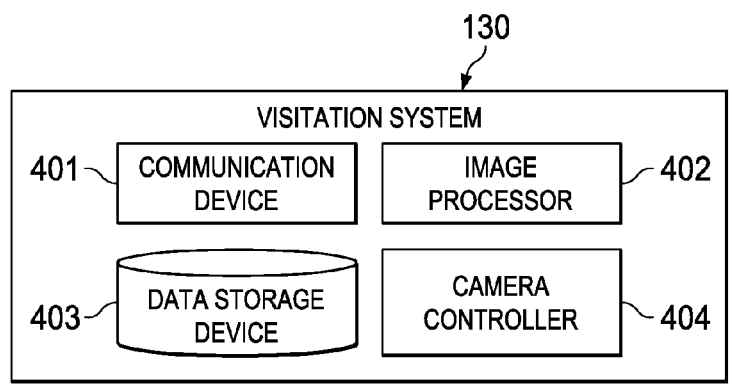

FIG. 4 is a block diagram of an embodiment of a visitation system.

Figure 5:
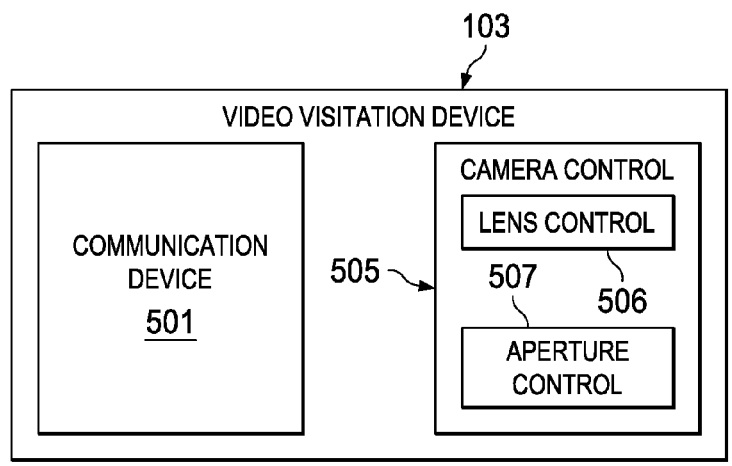

FIG. 5 is a block diagram of an embodiment of a video visitation device.

FIG. 6 is a block diagram of a computer system configured to implement various systems and methods described herein according to some embodiments.

Figure 7:
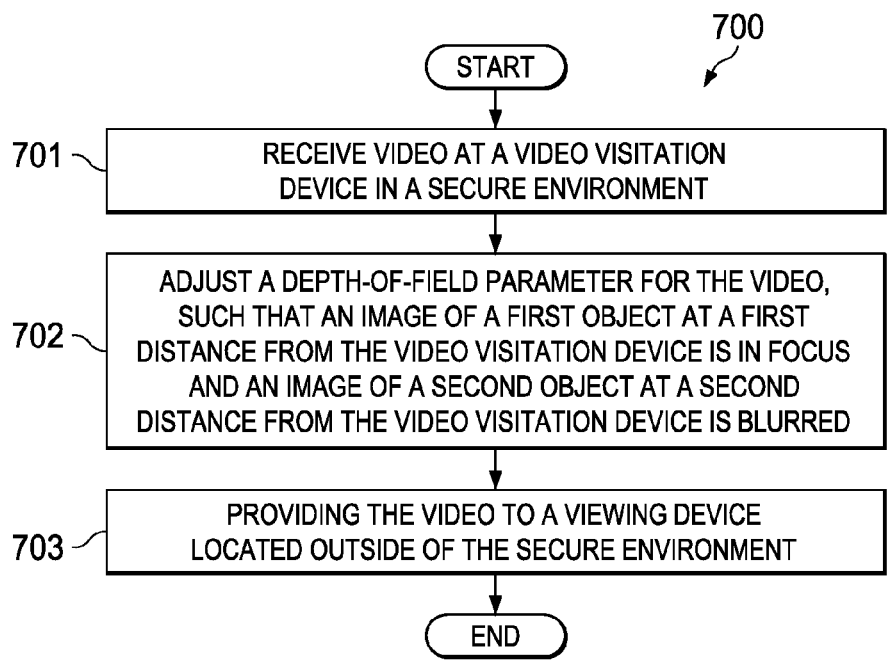

FIG. 7 is a flowchart of an embodiment of a method for video blurring in a secure environment.

Figure 8:
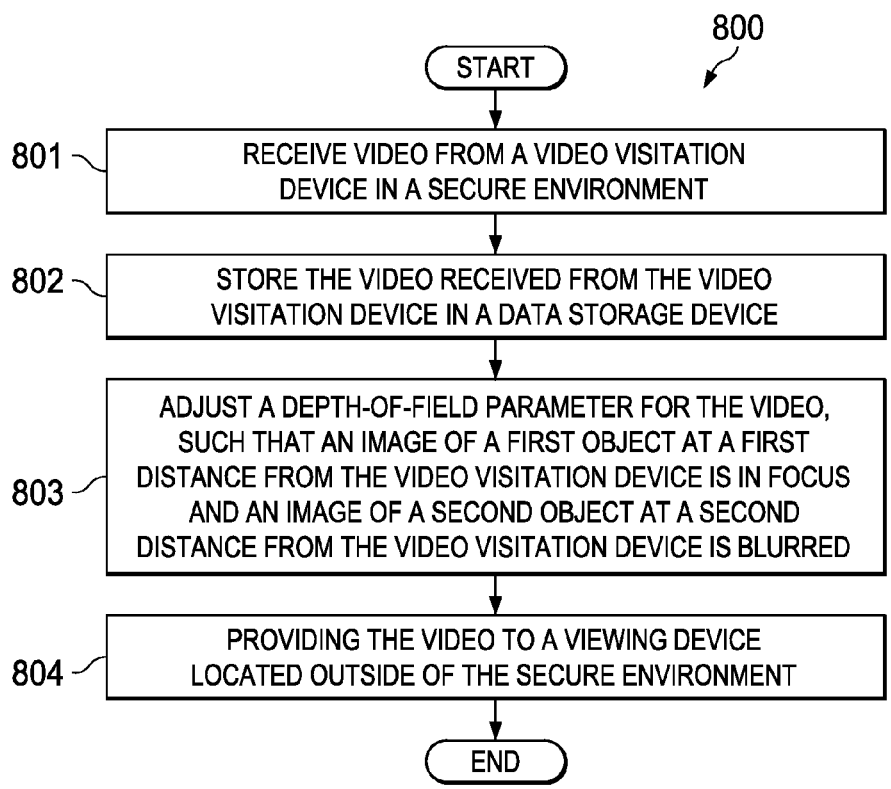

FIG. 8 is a flowchart of another embodiment method for video blurring in a secure environment.

FIG. 9 is an illustrative drawing of one embodiment of a blurred video frame.

DETAILED DESCRIPTION

This specification discloses systems and methods for video blurring in a secure environment. Generally speaking, the various techniques described herein may find applicability in a wide variety of controlled-environment facilities. Examples of controlled-environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation clinics, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities. For instance, in some of the embodiments discussed below, a controlled-environment facility may be referred to as a jail or prison, and its residents may be referred to as residents, arrestees, detainees, or inmates. It should be understood, however, that the systems and methods described herein may be similarly applicable to other types of controlled-environment facilities and their respective residents (e.g., a hospital and its patients).

Turning now to FIG. 1, a block diagram of an illustrative environment where a visitation system may be employed is depicted according to some embodiments. As shown, communication processing system 101 may provide telephone services, videoconferencing, online chat, and other communication services to a controlled-environment facility. For example, in some cases, communication system 101 may be co-located with a controlled-environment facility. Alternatively, communication system 101 may be centrally or remotely located with respect to one or more controlled-environment facilities and/or may provide communication services to multiple controlled-environment facilities. More generally, however, it should be noted that communication system 101 may assume a variety of forms, and may be configured to serve a variety of facilities and/or users, whether within or outside of a controlled-environment facility.

In one embodiment, a hybrid system may be implemented. The hybrid system may include one or more centrally located components and one or more components that are located on the premises of the controlled facility. For example, a data storage may be located in an off-site cloud storage facility. In some embodiments, servers, security monitoring systems and other components described in further detail below may be located in a central or remote facility. In embodiments of a hybrid system, other components may be located within the controlled facility. For example, in some embodiments a video visitation device as described in FIGS. 2-3 may be located within the controlled facility. In certain embodiments, the inmates may be able to communicate using the video visitation devices with persons located outside of the controlled facility, wherein the person outside of the facility uses a desktop computer, tablet computer, or the like. In another embodiment, the inmate may communicate with a person located inside of the controlled facility such as a visitation area. In such an embodiment, but he inmate and the visitor may communicate using a video visitation device respectively.

In the context of a correctional facility, for instance, inmates may use video-enabled telephones 102 to access certain communication services. In some facilities, inmates may also use a personal computer wireless device 104 to access such services. For example, an inmate may initiate telephone services by lifting the receiver on telephone 102, at which time the inmate may be prompted to provide a personal identification number (PIN), other identifying information or biometrics. An interactive voice response (IVR) unit or interactive smart device which may use visual keys (touchscreen or the like) (not shown) may generate and play prompt or other messages to inmates on devices 102 and/or 104.

Under the control of communication processing system 101, devices 102 and 104 may be capable of connecting to a non-resident's (i.e., a person not committed to a controlled-environment facility) telephone 106 or device 105 across a publicly switched telephone network (PSTN) 107. For example, telephone 106 may be located at a non-resident's home, inmate visitation center, etc. Switch 108 in communication processing system 101 may be used to connect calls across PSTN 107. Additionally or alternatively, the non-resident may be at telephone 109 or device 112, which is on an Integrated Services Digital Network (ISDN), Voice-over-IP (VoIP), or packet data network 110, such as, for example the Internet. Router 111 of communication system 101 is used to route data packets associated with a call connection to destination telephone 109.

Video visitation devices 103a-n (each collectively referred to as "video visitation device 103") may have video conferencing capabilities to enable inmates to participate in video visitation sessions with non-residents of the correctional facility via video call, secure online chat, etc. For example, a non-resident party may have a personal or laptop computer 113 with camera 114 (or a cell phone, tablet computer, etc.). In another embodiment, the non-residents may also use a separate set of video visitation devices 103c-m. In one embodiment, the non-resident may use a video visitation device 103c-m outside of the facility. In another embodiment, the non-resident may use a video visitation device 103c-m located in a secure area within the facility. A network connection between the parties may be established and supported by an organization or commercial service that provides computer services and software for use in telecommunications and/or VOIP, such as SKYPE® or by a propriety system. Additionally or alternatively, the correctional facility and/or the destination may use video conferencing equipment compatible with ITU H.323, H.320, H.264, and/or V.80, or other suitable standards. Generally speaking, each video visitation device 103 may be disposed in a visitation area of the controlled-environment facility. As noted above, there may be objects or persons in the environment of the video visitation which may be private or objectionable. For example, when an inmate is conducting a video visitation call, other inmates of the facility may exhibit objectionable behaviors in the background of the frame captured by the video visitation device 103. For these and other reasons, the inventor hereof has developed various systems and methods of blurring video captured by the video visitation devices 103, as described in more detail in connection with FIGS. 2-6 below.

In addition to providing certain visitation and communication operations, communication processing system 101 may attempt to ensure that an inmate's calls, video conferences, online chats, etc. are performed only with non-residents whose identities, devices, email addresses, phone numbers, etc. are listed in that inmate's Pre-Approved Contact (PAC) list. Each inmate's PAC list may be stored, for example, in database 115 maintained by an Administration and Management System (AMS) 116. In addition to PAC list(s), AMS 116 may also store inmate or resident profile data (RPD), as well as visitation rules applicable to each inmate. As an example, in the context of a correctional facility, database 115 may include information such as balances for inmate trust and calling accounts, trial schedule, conviction data, criminal record, sentencing data, such as time served, time remaining to be served, and release date, cell and cellmate assignments, inmate restrictions and warnings, commissary order history, telephone call history, call recordings, known or suspected gang or criminal affiliations, known or suspected affiliates, accomplices, or gang members; and any other information that may be relevant or useful to correctional facility staff to house and maintain inmates.

In some embodiments, database 115 may also indicate a personalized level of lighting that should be provided to a particular inmate during the inmate's video visitation sessions depending, for example, upon who the identit(ies) of the inmate and/or the non-resident. Such personalized lighting levels may be configured according to the facility's goals.

Visitation system 130 may be configured to provide, schedule, and manage visitation services to residents and non-residents of a controlled-environment facility. To that end, visitation system 130 may be coupled to PSTN 107 and/or network 110 in a manner similar to communication processing system 101 by also including one or more switches and/or routers (not shown). Accordingly, visitation system 130 may be configured to communicate with one or more residents of the controlled-environment facility via devices 102-104 and with one or more non-residents via devices 105, 106, 109, 112, and/or 113. Although visitation system 130 is shown in FIG. 1 as being remotely located with respect to communication processing system 101 and the controlled-environment facility, in other cases visitation system 130 may be co-located with the facility and/or integrated within system 101.

In some implementations, communication system 101 may be configured to perform video visitation monitoring operations configured to monitor and or record video visitations (e.g., as video files). In scenarios where communication system 101 is located within the controlled-environment facility, it may have direct access to AMS 116. In other embodiments, however, communication system 101 may be located remotely with respect to the controlled-environment facility, and access to AMS 116 may be obtained via a computer network such as, for example Network 110.

FIG. 2 is a diagram of a video visitation device 103. In some embodiments, device 103 may be implemented as a computer-based system such as described in connection with FIG. 4. As illustrated, device 103 includes display 204, camera 205, and handset 201 coupled to device 103 via wire 209. Display 204 may be any suitable electronic display such as, for example, a Liquid Crystal Display (LCD), a touchscreen display (e.g., resistive, capacitive, etc.), or the like, whereas camera 205 may be any suitable imaging device such as, for instance, a video camera or webcam equipped with Charge-Coupled Devices (CCDs), Complementary Metal-Oxide-Semiconductor (CMOS) active pixel sensors, etc. Handset 201 may be similar to a traditional telephone handset including an earpiece portion (with a speaker), a handle portion, and a mouthpiece portion (with a microphone).

During a video visitation session, video visitation device 103 may be configured to capture a video image of an inmate to be transmitted to a non-resident using camera 205, and to display a video image of the non-resident to the inmate using display 204. Video visitation device 103 may also be configured to capture an audio signal from the inmate to be transmitted to the non-resident using the mouthpiece portion of handset 201, and to provide an audio signal from the non-resident to the inmate using the earpiece portion of handset 201. Additionally or alternatively, audio received from the non-resident may be reproduced via loudspeaker 202, and audio provided by the inmate may be captured via microphone 203. In some embodiments, handset holder or holster 208 may be configured to allow a user to securely rest handset 201 against device 103 (e.g., in its "off" position) when device 103 is not in use. Furthermore, handset holder 208 may include a mechanical or electromechanical switch or sensor (not shown) that senses when handset 201 is not resting against it (e.g. in its "on" position).

Video visitation device 103 may also include lighting device 206 and lighting sensor 207. In some embodiments, lighting device 206 may include one or more incandescent light sources (e.g., bulbs, lamps, etc.), fluorescent lamps, Compact Fluorescent Lamps (CFL), Cold Cathode Fluorescent Lamps (CCFL), high-intensity discharge sources, Light-Emitting Diodes (LEDs), or the like. Additionally or alternatively, lighting device 206 may include one or more adjustable lighting devices with variable intensity, brightness, luminance, color, tone, etc. Lighting or light sensor 207 may include one or more suitable sensors such as, for example, photoresistors, photodiodes, etc. In various implementations, camera 205 may serve as light sensor 207, and light sensor 207 may be absent.

Furthermore, it should be noted that, outside of correctional facilities, video visitation device 103 may assume the form of any computer, tablet computer, smart phone, etc., or any other consumer device or appliance with videoconferencing capabilities. For example, in the case where video visitation device 103 is a camera-enabled television (or smart phone, etc.) that does not include a dedicated lightning apparatus, the brightness of display 204 may be adjusted so that display 204 may itself act as lighting device 206 (e.g., the brightness of display 204 may be increased to also increase the illumination of the person(s) "watching" the teleconference through the television, for example, upon detection that a video connection has been established).

In the context of correctional facilities, video visitation device 103 may include one or more tampering/impact resistant or hardened elements configured to protect them from vandalism or otherwise destructive acts. For example, one or more of devices 202-207 may be protected by a transparent plastic or thermoplastic (e.g., Plexiglas, etc.) material.

In one embodiment, the video visitation device 103 may include a keypad 210 or other user input device to allow a user to enter information. For example, the user may dial a telephone number associated with a recipient of a video visitation call, enter an account number for billing purposes, or enter a Personal Identification Number (PIN) or inmate number for authentication and/or identification purposes.

FIG. 3 is a block diagram illustrating one embodiment of a video camera device 205 for use in a video visitation system 103. In an embodiment, the video camera device 205 may include an image sensor 301. For example, the image sensor may be configured to capture a sequence of images suitable for generating video. One of ordinary skill will recognize that there are many different image sensors 301 which may be used according to the present embodiments, including Charge-Coupled Devices (CCDs) or Complimentary Metal-Oxide-Semiconductor (CMOS) image sensors.

In an embodiment, an arrangement of one or more lenses 303 and/or an aperture mechanism 302 may be coupled to the image sensor 301. For example, a first lens 303a and a second lens 303b may be used to set a focal length of the camera device 205. The focal length may be adjusted by adjusting a distance between the first lens 303a and the second lens 303b. The aperture mechanism 302 may be adjusted to change the aperture through which light passes to the image sensor 301. The depth of field of the camera 205 may be adjusted by either changing the focal length by adjusting the lenses 303a,b or by adjusting the aperture size by adjusting the aperture mechanism 302. In general, the ratio of the focal length set by the lenses 303a and/or 303b to the aperture size is referred to as the f-stop or relative aperture of the camera system 205. The depth of field is the distance between the nearest and farthest objects in a scene that appear acceptably sharp in an image. The depth of field may be manipulated by adjustment of the f-stop of the camera system 205 or through digital processing techniques.

In such an embodiment, the depth of field of the camera system 205 may be adjusted such that a first object 304 positioned at a first distance 306 from the image sensor 301 may be in focus, while a second image 305 positioned at a second distance 307 or greater may be blurred. The lenses 303a-b and/or the aperture mechanism 302 may be adjusted to increase or decrease the depth of field of the camera system such that both the first object 304 and the second object 305 are in focus at a first setting, or such that only the first object 304 is in focus at a second setting, or such that only the second object is in focus at a third setting.

FIG. 4 is a block diagram of an embodiment of the visitation system 130. In one embodiment, the visitation system 130 may include a communication device 401, an image processor 402, data storage device 403, and a camera controller 404. The communication device 401 may be configured to receive video from the video visitation devices 102, 103, and/or 104. Additionally, the communication device 401 may be configured to communicate video to a remote device, such as computer 113, non-resident's telephone 106 or 105 or smartphone device 112. In a particular embodiment, the remote device is located outside of the secure environment. For example, the communication device 401 may be configured to communicate the video to family or friends requesting access to video visitation with an inmate in the secure facility.

The video received from the video visitation device 103 may be stored in the data storage device 403. In such an embodiment, the received video may be stored for evidence of a crime, for review by a counselor, for review by an investigator, or for any other reason. In one embodiment, the visitation system 130 may be configured to provide the original video stored in the data storage device 403 to an investigator in response to a request from the investigator. In another embodiment, a third party, such as a security officer, investigator, facility administrator, or counselor may monitor the video as it is received, and tag or flag certain portions of the received video in a database stored in the data storage device 403 in association with the video for further review by the investigator, counselor, or the like.

The image processor 402 may be configured to change certain parameters of the video received from the video visitation device 103 such that portions of the video frames are blurred. In one embodiment, certain sets of frames associated with inappropriate conduct may be censored and blurred before sending them to the remote device. In another embodiment, a background portion of received video frames may be blurred or otherwise obscured. In still another embodiment, a selectable portion of video frames may be blurred or otherwise obscured in response to a selection by a censor or security officer. For example, if a security officer reviewing the video identifies that inappropriate conduct is taking place in view of the video visitation device 103, then the censor or security officer may select a portion of the video frames by dragging a box, circle, or other shape around a portion to be blurred. In another embodiment, the censor or security officer may provide indicia indicating that the entire background of a portion of video is to be blurred. In various embodiments discussed with relation to FIG. 6, the visitation system 130 may include or be associated with hardware and software devices suitable for allowing a monitor, censor, or security officer to review video and enter inputs for censoring, blurring, or otherwise obscuring portions of video received by the video visitation device 103. In certain embodiments, image processor 402 may digitally edit or modify the received video to blur or otherwise obscure the received video before sending it to the remote device. In these various embodiments, the image processor 402 may blur the image according to a blurring factor which may be preset or set by a user. The blurring factor may be a setting used to determine how much objects in the video will be blurred or obscured.

In one embodiment, the visitation system 130 may include a camera controller 404 which may also be used to blur the video. In such an embodiment, the camera controller 404 may communicate commands to a lens mechanism 303a,b and/or to an aperture mechanism 302 for controlling the depth of field of the camera 205, and thereby blurring portions of images captured by the camera 205. In another embodiment, the camera controller 404 may communicate commands to a secondary camera control 505 as described in FIG. 5. The secondary camera control 505 may be included in the video visitation device 103. In certain embodiments, a monitor, censor, or security officer reviewing the video may enter an input indicating that the camera 205 should blur a portion of the video. In such an embodiment, the camera controller 404 may issue a command to adjust the lens 303 and/or the aperture mechanism 302.

FIG. 5 is a block diagram of software configurable to run on a video visitation device 130. The communication device 501 may be configured to communicate video to the visitation system 130. The communication device 501 may also receive video control commands from the visitation system 130. For example, the camera controller 404 on the visitation system 130 may issue a command to blur a background portion of the video. The communication device 501 may receive the command and relay it to the camera control 505. The camera control 505 may include a lens control 506 configured to adjust the focal length of the lenses 303$a,b$. Additionally, the camera control 505 may include an aperture control 507 configured to adjust an aperture diameter of the aperture mechanism 302. Accordingly, through adjustment of the focal length and or the aperture, the depth of field of the camera system 205 may be adjusted, thereby blurring some objects in the image while keeping other objects in focus.

FIG. 6 is a schematic block diagram illustrating one embodiment of a computer system 600 configurable for video blurring in a secure environment. In one embodiment, the video visitation device 130 and/or the visitation system 130 may be implemented on a computer system similar to the computer system 600 described in FIG. 6. Similarly, the remote devices, such as laptop 113 may be implemented on a computer system similar to the computer system 600 described in FIG. 6. In various embodiments, computer system 600 may be a server, a mainframe computer system, a workstation, a network computer, a desktop computer, a laptop, or the like.

As illustrated, computer system 600 includes one or more processors 601A-N coupled to a system memory 602 via bus 603. Computer system 600 further includes network interface 604 coupled to bus 603, and input/output (I/O) controller(s) 605, coupled to devices such as cursor control device 606, keyboard 607, and display(s) 608. In one embodiment, the I/O controller(s) 605 may be coupled to a camera 205. In some embodiments, a given entity (e.g., video visitation device 103) may be implemented using a single instance of computer system 600, while in other embodiments multiple such systems, or multiple nodes making up computer system 600, may be configured to host different portions or instances of embodiments (e.g., visitation system 130).

In various embodiments, computer system 600 may be a single-processor system including one processor 601A, or a multi-processor system including two or more processors 601A-N(e.g., two, four, eight, or another suitable number). Processor(s) 601A-N may be any processor capable of executing program instructions. For example, in various embodiments, processor(s) 601A-N may be general-purpose or embedded processors implementing any of a variety of instruction set architectures (ISAs), such as the x86, POWERPC®, ARMO, SPARC®, or MIPS® ISAs, DSP's (digital signal processor) or any other suitable ISA. In multi-processor systems, each of processor(s) 601A-N may commonly, but not necessarily, implement the same ISA. Also, in some embodiments, at least one processor(s) 601A-N may be a graphics processing unit (GPU) or other dedicated graphics-rendering device.

System memory 602 may be configured to store program instructions and/or data accessible by processor(s) 601A-N. For example, memory 602 may be used to store software program and/or database shown in FIGS. 7-8. In various embodiments, system memory 602 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described above, may be stored within system memory 602 as program instructions 609 and data storage 660, respectively. In other embodiments, program instructions and/or data may be received, sent or stored upon different types of computer-accessible media or on similar media separate from system memory 602 or computer system 600. Generally speaking, a computer-accessible medium may include any tangible, non-transitory storage media or memory media such as electronic, magnetic, or optical media—e.g., disk or CD/DVD-ROM coupled to computer system 600 via bus 603, or non-volatile memory storage (e.g., "flash" memory)

The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 603 may be configured to coordinate I/O traffic between processor 601, system memory 602, and any peripheral devices including network interface 604 or other peripheral interfaces, connected via I/O controller(s) 605. In some embodiments, bus 603 may perform any necessary protocol, timing or other data transformations to convert data signals from one component (e.g., system memory 602) into a format suitable for use by another component (e.g., processor(s) 601A-N). In some embodiments, bus 603 may include support for devices attached through various types of peripheral buses, such as a variant of the Peripheral Component Interconnect (PCI) bus standard or the Universal Serial Bus (USB) standard, for example. In some embodiments, the operations of bus 603 may be split into two or more separate components, such as a north bridge and a south bridge, for example. In addition, in some embodiments some or all of the operations of bus 603, such as an interface to system memory 602, may be incorporated directly into processor(s) 601A-N.

Network interface 604 may be configured to allow data to be exchanged between computer system 600 and other devices, such as other computer systems attached to visitation system 130, for example. In various embodiments, network interface 604 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

I/O controller(s) 605 may, in some embodiments, enable connection to one or more display terminals, keyboards, keypads, touch screens, scanning devices, voice, camera, or optical recognition devices, or any other devices suitable for entering or retrieving data by one or more computer system 600. Multiple input/output devices may be present in computer system 600 or may be distributed on various nodes of computer system 600. In some embodiments, similar I/O devices may be separate from computer system 600 and may interact with computer system 600 through a wired or wireless connection, such as over network interface 604.

As shown in FIG. 6, memory 602 may include program instructions 609, configured to implement certain embodiments described herein, and data storage 610, comprising various data accessible by program instructions 609. In an embodiment, program instructions 609 may include software elements of embodiments illustrated in FIGS. 7-8. For example, program instructions 609 may be implemented in various embodiments using any desired programming language, scripting language, or combination of programming languages and/or scripting languages. Data storage 610 may include data that may be used in these embodiments such as, for example, visitation system 130. In other embodiments, other or different software elements and data may be included.

A person of ordinary skill in the art will appreciate that computer system 600 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

Embodiments of visitation system 130 described in FIG. 4 and/or video visitation device 103 described in FIG. 1 may be implemented in a computer system that is similar to computer system 600. In one embodiment, the elements described in FIG. 1 may be implemented in discrete hardware modules. Alternatively, the elements may be implemented in software-defined modules which are executable by one or more of processors 601A-N, for example.

FIG. 7 is a flowchart of an embodiment of a method 700 for video blurring in a secure environment. In one embodiment, the method 700 starts when the video visitation device 103 in the secure environment 100 receives 701 video. For example, the camera 205 of the video visitation device 103 may capture video of an inmate. The camera control 505 may adjust 702 a depth of field parameter for the video such that the first object 304 at a first distance 306 is in focus and the second object 305 at the second distance 307 is blurred. The communication device 501 may then provide 703 the video to a viewing device, such as computer 113, located outside of the secure environment.

FIG. 8 is a flowchart of another embodiment method 800 for video blurring in a secure environment. In one embodiment, the visitation system 130 may receive 801 video from a video visitation device 103 located in a secure environment. The visitation system 130 may then store 802 the video received 801 from the video visitation device 103 in a data storage device 403. Thereafter, the camera controller 404 may adjust 803 a depth of field parameter for the video such that the first object 304 at a first distance 306 is in focus and the second object 305 at the second distance 307 is blurred. Alternatively, the image processor 402 may adjust 403 a depth of field parameter or otherwise blur or obscure a portion of the video. The communication device 401 may then provide 804 the processed video to a viewing device located outside of the secure environment.

FIG. 9 is an illustrative drawing of one embodiment of a blurred video frame 900. As illustrated, the first object 304 may be a face 901. The second object 305 may be anything located at a predefined distance from the face 901, for example in the background 902 which is blurred. In such an embodiment, the face 901 may be able to move within the depth of field of the camera 205 without artifacts associated with facial recognition, but all objects located outside of the depth of field, for example in the background 902, will be blurred or obscured. In certain embodiments, a maximum depth of field may be set and predefined for a specific camera. For example, a camera 205 may be placed in front of an entrance to a restroom or shower room. In such an embodiment, the maximum depth of field may be set to a very shallow distance to ensure that objects or persons entering the restroom or shower room are blurred or otherwise obscured, while still allowing the person whose face is located within the depth of field to be in focus. For example, as shown in FIG. 9, a second inmate in the background 902 may have blurred features to maintain the privacy of the second inmate 903. In a further embodiment, the second inmate 903 may be so obscured that his actions or demeanor are also blurred and obscured.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method, comprising:
receiving video at a video visitation device in a secure environment;
adjusting a depth of field parameter for the video, such that an image of a first object at a first distance from the video visitation device is in focus and an image of a second object at a second distance from the video visitation device is blurred; and
providing the video to a viewing device located outside of the secure environment.

2. The method of claim 1, wherein adjusting the depth of field parameter further comprises adjusting an f-stop setting of a camera associated with the video visitation device.

3. The method of claim 2, wherein adjusting the f-stop setting further comprises adjusting a focal length of a lens coupled to the video visitation device.

4. The method of claim 2, wherein adjusting the f-stop setting further comprises adjusting an aperture setting of the camera associated with the video visitation device.

5. The method of claim 1, wherein adjusting the depth of field parameter further comprises processing the video received from the video visitation device in a video processing device to blur one or more objects at the second distance from the video visitation device.

6. The method of claim 1, wherein adjusting the depth of field parameter is remotely controllable by a third party.

7. The method of claim 5, further comprising providing the video to a second viewing device for security monitoring, the second viewing device being associated with a remote control device configured to allow a third party monitor to remotely control the depth of field parameter.

8. A tangible computer readable medium comprising computer executable code that, when executed by a processing device, causes the processing device to perform operations comprising:
 receiving video from a video visitation device in a secure environment;
 storing the video received from the video visitation device in a data storage device;
 adjusting a depth of field parameter for the video, such that an image of a first object at a first distance from the video visitation device is in focus and an image of a second object at a second distance from the video visitation device is blurred; and
 providing the adjusted video to a viewing device located outside of the secure environment.

9. The computer readable medium of claim 8, wherein adjusting the depth of field parameter further comprises processing the video received from the video visitation device in a video processing device to blur one or more objects at the second distance from the video visitation device.

10. The computer readable medium of claim 8, wherein adjusting the depth of field parameter is remotely controllable by a third-party monitor.

11. The computer readable medium of claim 10, further comprising providing the video to a second viewing device for security monitoring, the second viewing device being associated with a remote control device configured to allow the third-party monitor to remotely control the depth of field parameter.

12. The computer readable medium of claim 11, further comprising providing the video stored in the data storage device to an investigator in response to indicia from the third-party monitor.

13. The computer readable medium of claim 8, further comprising providing the video stored in the data storage device to an investigator in response to a request from the investigator.

14. A system, comprising:
 a data communication device configured to receive video from a video visitation device in a secure environment;
 a data storage device coupled to the data communication device and configured to store the video received from the video visitation device;
 a data processor configured to adjust a depth of field parameter for the video, such that an image of a first object at a first distance from the video visitation device is in focus and an image of a second object at a second distance from the video visitation device is blurred; and
 wherein the data communication device is configured to provide the video to a viewing device located outside of the secure environment.

15. The system of claim 14, further comprising a camera controller configured to adjust an f-stop setting of a camera associated with the video visitation device.

16. The system of claim 15, wherein the camera controller is controllable by a third-party to remotely adjust the f-stop setting.

17. The system of claim 15, wherein the camera controller is further configured to adjust a focal length of a lens coupled to the video visitation device.

18. The system of claim 15, wherein the camera controller is further configured to adjust an aperture setting of the camera associated with the video visitation device.

19. The system of claim 14, further comprising a second viewing device for security monitoring, the second viewing device being associated with a remote control device configured to allow a third-party to remotely control the depth of field parameter.

20. The system of claim 19, wherein the data communication device is further configured to provide the video stored in the data storage device to an investigator in response to indicia from the third-party.

21. The system of claim 14, further configured to provide the video stored in the data storage device to an investigator in response to a request from the investigator.

* * * * *